US008968092B2

(12) United States Patent
Gomez et al.

(10) Patent No.: US 8,968,092 B2

(45) Date of Patent: Mar. 3, 2015

(54) INTEGRATING WAGERING GAMES AND ENVIRONMENTAL CONDITIONS

(75) Inventors: Benjamin T. Gomez, Chicago, IL (US); Timothy T. Gronkowski, Chicago, IL (US); Scott A. Massing, Lincolnwood, IL (US); Robert W. Morgan, III, Villa Park, IL (US); Alfred Thomas, Las Vegas, NV (US)

(73) Assignee: WMS Gaming, Inc., Waukegan, IL (US)

( * ) Notice: Subject to any disclaimer, the term of this patent is extended or adjusted under 35 U.S.C. 154(b) by 85 days.

(21) Appl. No.: 13/510,875

(22) PCT Filed: Nov. 19, 2010

(86) PCT No.: PCT/US2010/057368

§ 371 (c)(1), (2), (4) Date: May 18, 2012

(87) PCT Pub. No.: WO2011/063197

PCT Pub. Date: May 26, 2011

(65) Prior Publication Data

US 2012/0231886 A1 Sep. 13, 2012

Related U.S. Application Data

(60) Provisional application No. 61/263,009, filed on Nov. 20, 2009.

(51) Int. Cl.
*A63F 13/00* (2014.01)
*G07F 17/32* (2006.01)

(52) U.S. Cl.
CPC ............ *G07F 17/32* (2013.01); *G07F 17/3206* (2013.01)
USPC ................... 463/33; 463/30; 463/31; 463/32; 463/34

(58) Field of Classification Search
CPC ............ G07F 17/3206; G07F 17/3211; A63F 2300/1093; A63F 2300/69; A63F 2300/8082; A63F 2300/1087; G06T 19/006; G06T 15/50; G06T 15/60; G06K 9/2036; H04N 13/0055; H04N 13/0014
USPC ...................................................... 463/30–34
See application file for complete search history.

(56) References Cited

U.S. PATENT DOCUMENTS 6,726,567 B1 * 4/2004 Khosla ............................ 463/42
6,805,633 B2 10/2004 Hein, Jr. et al.

(Continued)

FOREIGN PATENT DOCUMENTS

WO WO-2009143257 11/2009
WO WO-2011063197 5/2011

OTHER PUBLICATIONS

U.S. Appl. No. 13/788,111, filed Mar. 7, 2013, Burke, Mary M., et al.

(Continued)

*Primary Examiner* — Justin Myhr
(74) *Attorney, Agent, or Firm* — DeLizio Gilliam, PLLC

(57) ABSTRACT

A wagering game system and its operations are described herein. In embodiments, the operations can include detecting characteristics of at least one environmental condition in an external environment that is external to a wagering game machine in a casino (e.g., detect activity that occurs in the casino, detect appearance of people and objects in the casino, detect light and sound events, etc.). The operations can further include generating an animated wagering game effect in a wagering game animation, using the detected characteristics of the environmental condition. The animated wagering game effect can affect one or more wagering game objects within the wagering game animation in a way that emulates the environmental condition.

21 Claims, 7 Drawing Sheets

(56) References Cited

U.S. PATENT DOCUMENTS

| | | | | |
|---|---|---|---|---|
| 7,053,915 | B1 * | 5/2006 | Jung et al. | 345/633 |
| 7,364,508 | B2 | 4/2008 | Loose et al. | |
| 7,479,063 | B2 | 1/2009 | Pryzby et al. | |
| 7,479,065 | B1 | 1/2009 | McCallister et al. | |
| 7,867,085 | B2 | 1/2011 | Pryzby et al. | |
| 2004/0005924 | A1 | 1/2004 | Watabe et al. | |
| 2004/0239670 | A1 * | 12/2004 | Marks | 345/419 |
| 2005/0207486 | A1 * | 9/2005 | Lee et al. | 375/240.01 |
| 2005/0288099 | A1 * | 12/2005 | Shimizu et al. | 463/37 |
| 2006/0068909 | A1 | 3/2006 | Pryzby et al. | |
| 2006/0281543 | A1 | 12/2006 | Sutton et al. | |
| 2007/0236485 | A1 * | 10/2007 | Trepte | 345/207 |
| 2007/0259716 | A1 | 11/2007 | Mattice et al. | |
| 2007/0265074 | A1 * | 11/2007 | Akahori et al. | 463/35 |
| 2007/0265089 | A1 * | 11/2007 | Robarts et al. | 463/42 |
| 2008/0064486 | A1 | 3/2008 | Pryzby et al. | |
| 2008/0076546 | A1 | 3/2008 | Moyle et al. | |
| 2008/0100620 | A1 * | 5/2008 | Nagai et al. | 345/424 |
| 2008/0113755 | A1 | 5/2008 | Rasmussen et al. | |
| 2008/0139284 | A1 | 6/2008 | Pryzby et al. | |
| 2008/0176654 | A1 | 7/2008 | Loose et al. | |
| 2008/0194320 | A1 | 8/2008 | Walsh et al. | |
| 2008/0207308 | A1 | 8/2008 | Yoshizawa | |
| 2009/0115784 | A1 * | 5/2009 | Tomite et al. | 345/426 |
| 2009/0163267 | A1 * | 6/2009 | Fine | 463/20 |
| 2010/0317437 | A1 | 12/2010 | Berry et al. | |
| 2011/0092288 | A1 | 4/2011 | Pryzby et al. | |
| 2011/0115413 | A1 | 5/2011 | Erickson et al. | |
| 2011/0118034 | A1 | 5/2011 | Jaffe et al. | |
| 2011/0223993 | A1 | 9/2011 | Allen et al. | |
| 2011/0263326 | A1 | 10/2011 | Gagner et al. | |
| 2012/0028720 | A1 | 2/2012 | Gagner et al. | |
| 2012/0129601 | A1 | 5/2012 | Gronkowski et al. | |
| 2012/0178523 | A1 | 7/2012 | Greenberg et al. | |
| 2012/0178528 | A1 | 7/2012 | Brunell et al. | |
| 2013/0085001 | A1 | 4/2013 | Anderson et al. | |

OTHER PUBLICATIONS

"PCT Application No. PCT/US10/57368 International Search Report", Mar. 23, 2011 , 10 pages.

"Reflection Mapping", *Wikipedia* http://en.wikipedia.org/wiki/Reflection_mapping (Obtained from the Internet Sep. 18, 2009) Sep. 11, 2009 (Last Modified) , 4 pages.

"PCT Application No. PCT/US10/57368 International Preliminary Report on Patentability", Jun. 29, 2012 , 11 pages.

* cited by examiner

INTEGRATING WAGERING GAMES AND ENVIRONMENTAL CONDITIONS

RELATED APPLICATIONS

This application claims the priority benefit of U.S. Provisional Application Ser. No. 61/263,009 filed Nov. 20, 2009

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

TECHNICAL FIELD

Embodiments of the inventive subject matter relate generally to wagering game systems and networks that, more particularly, integrate wagering games and environmental conditions.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play. Further, environmental effects that surround a wagering game machine are useful for engaging a player's attention and immersing the player in the gaming experience. Therefore, there is also a continuing need for wagering game manufacturers to develop new and interesting environmental effects that integrate with gaming activity.

SUMMARY

In some embodiments, a system comprises at least one environmental sensor configured to detect characteristics of at least one environmental condition in an external environment that is external to a wagering game machine in a casino, and generate environmental condition data that characterizes the environmental condition in the external environment; an animation integration module configured to receive the environmental condition data from the at least one environmental sensor, and generate an animated wagering game effect, using the environmental condition data, that affects one or more wagering game objects within a wagering game animation in a way that emulates the environmental condition; and a display controller configured to present the animated wagering game effect as part of a wagering game presentation for a wagering game application.

In some embodiments, the animation integration module is further configured to determine at least one animation object construction rule for the wagering game application that relates to the environmental condition data, determine a three-dimensional effect that the environmental condition would have on the one or more wagering game objects in the wagering game animation based on an application of the environmental condition data to the at least one animation object construction rule, and apply the three-dimensional effect to at least one of the one or more wagering game objects in the wagering game animation.

In some embodiments, the three-dimensional effect relates to one or more of shadowing of wagering game objects, color gradients of wagering game objects, depth perspective of wagering game object geometries, and reflections off of wagering game objects.

In some embodiments, the at least one environmental sensor is configured to take pictures from multiple camera angles around the wagering game machine, and wherein the animation integration module is further configured to map three-dimensional reflections within the game animation to the multiple camera angles.

In some embodiments, the animation integration module is further configured to generate an animated wagering game object that looks similar to an environmental object external to the wagering game machine, and alter the appearance of the animated wagering game object to comply with one or more game conditions of the wagering game animation.

In some embodiments, one or more machine-readable media having instructions stored thereon, which when executed by a set of one or more processors cause the set of one or more processors to perform operations comprises: receiving input of a lighting event within a casino produced by an external light source external to a wagering game machine; determining from the input one or more external light source properties for the external light source; generating an animated representation of the one or more external light source properties in a wagering game animation of a wagering game application, wherein the animated representation of the one or more external light source properties affects animated lighting effects that occur to one or more wagering game application objects in a way that emulates the lighting event; detecting a change in the lighting event; and altering the animated representation of the one or more external light source properties on the wagering game application objects based on the change in the lighting event.

In some embodiments, the one or more external light source properties are one or more of a direction, a distance, an intensity, and a color of a light field that originates from the external light source.

In some embodiments, the operation for generating the animated representation of the one or more external light source properties includes operations further comprising: generating an internal light source, internal to the wagering game application, that possesses one or more internal light source properties equivalent to the one or more external light source properties; and controlling the animated lighting effects via the internal light source properties of the internal light source.

In some embodiments, the operation for generating the animated representation of the one or more external light source properties includes operations further comprising: determining a degree of shading that would occur by the external light source to physical objects of the same characteristics as the wagering game application objects, given a distance, direction, and intensity of the light produced from the external light source; and generating animated shadow effects for the wagering game application objects based on the degree of shading.

In some embodiments, the distance, direction, and intensity of the light are measured by one or more environmental sensors that are positioned by or on the wagering game machine to accurately measure the distance, direction, and intensity of the light.

In some embodiments, the distance, direction, and intensity of the light are provided by one or more casino network devices that control lighting.

In some embodiments, a computer-implemented method comprises receiving input of a sound event produced by an external sound source external to a wagering game machine; determining from the input at least one external sound property of the sound event produced by the external sound source; correlating the sound source property with at least one game-physics control factor of a wagering game application running on the wagering game machine, wherein the at least one game-physics control factor emulates the external sound property; applying the game-physics control factor in a way that generates a game effect that affects one or more animated wagering game objects of the wagering game application in a way that appears as if the external sound event affected the one or more animated wagering game objects; and generating an animated reaction by the one or more animated wagering game objects to the game effect.

In some embodiments, applying the game-physics control factor comprises, generating a game event, using the at least one game-physics control factor to control some part of the game event, and causing the physical game event to interact with the one or more animated wagering game objects resulting in the game effect.

In some embodiments, the computer-implemented method further comprises measuring the sound source property using sound sensors associated with a wagering game machine; generating a sound source property value that indicates the degree of the sound source property; generating game-physics control factor value that correlates with the degree of the sound source property value; and using the game-physics control factor value in at least one game-physics programming function that controls game-physics that affect the one or more animated wagering game objects.

In some embodiments, the at least one sound source property is a sound direction, the sound source property value is an indicator of the sound direction, and the game-physics control factor value is a direction value for a wind blast within the wagering game application.

In some embodiments, an apparatus, comprises an animation integration module configured to receive input that characterizes a visual perspective of a casino environment and one or more casino objects in the casino environment, generate an animated wagering game setting that emulates an appearance of the casino environment based on the visual perspective characterized by the input, generate one or more animated wagering game objects that emulate an appearance of the one or more casino objects in the casino environment based on the visual perspective characterized by the input, and present an animated perspective of the one or more animated wagering game objects within the animated wagering game setting in a way that emulates the visual perspective of the one or more casino objects in the casino environment.

In some embodiments, the visual perspective is based on an orientation a wagering game machine in relation to the casino environment and the one or more casino objects, and wherein the animation integration module is further configured to determine a change in the orientation of the wagering game machine in relation to the casino environment and the one or more casino objects, and present a change in the animated perspective of the one or more animated wagering game objects within the animated wagering game setting in way that matches the change in the orientation of the wagering game machine.

In some embodiments, the one or more casino objects are mobile within the casino environment, and wherein the animation integration module is further configured to determine a change in one or more of a position and an orientation of the one or more casino objects in relation to a sensor on a wagering game machine, and present a change in the animated perspective of the one or more animated wagering game objects within the animated wagering game setting in way that matches the change in the one or more of the position and the orientation of the one or more casino objects.

In some embodiments, the one or more casino objects are contained within a bounded area of the casino environment, and wherein the input characterizes a visual perspective of only the one of more casino objects that are contained within the bounded area.

In some embodiments, an apparatus, comprises means for receiving input that characterizes an air mass within an external environment that is external to a wagering game machine; means for determining from the input one or more air mass properties for the air mass; means for generating an animated representation of the one or more air mass properties in a wagering game animation of a wagering game application, wherein the animated representation of the one or more air mass properties affects one or more wagering game application objects; means for dynamically detecting a change in the one or more air mass properties; and means for dynamically altering the animated representation of the one or more one or more air mass properties on the one or more wagering game application objects based on the change in the one or more air mass properties.

In some embodiments, the apparatus further comprises means for detecting visible casino object reactions to the air mass; means for calculating a physical property of the air mass that causes the casino object reactions; means for generating a game effect that mimics the physical property of the air mass; and means for causing the one or more wagering game application objects to react to game effect in a way that emulates the casino object reactions to the air mass.

In some embodiments, the apparatus further comprises means for changing an appearance of the one or more wagering game application objects in a way that correlates with the one or more air mass properties, wherein changing the appearance comprises means for changing one or more of a color, a shape, a size, a state, a location, and a structure of the one or more wagering game application objects based on one or more of an air velocity, an air pressure, an air temperature, an air humidity, an air density, and an air opacity of the air mass.

In some embodiments, the air mass is a fog effect in the casino and wherein the means for generating the animated representation of the one or more air mass properties in the wagering game animation of a wagering game application comprises means for generating an animated representation of the fog effect within the wagering game application, means for obscuring an appearance of the one or more wagering game application objects using the animated representation of the fog effect, and means for affecting a wagering game result of the wagering game application based on the obscuring of the one or more wagering game application objects by the animated fog effect.

In some embodiments, the apparatus further comprises means for detecting a player activity that counteracts affects of the animated representation of the one or more air mass properties on the one or more wagering game application objects.

In some embodiments, the air mass is associated with weather that is external to the casino.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into six sections. The first section provides an introduction to embodiments. The second section describes example operating environments while the third section describes example operations performed by some embodiments. The fourth section describes additional example embodiments while the fifth section describes additional example operating environments. The sixth section presents some general comments.

Introduction

This section provides an introduction to some embodiments.

Wagering games are expanding in popularity. Many wagering game enthusiasts are demanding greater access to wagering games and content related to wagering games. Wagering game providers are constantly in need of concepts that can make the gaming industry appealing and profitable. Some wagering game providers have attempted to enhance the wagering game experience by implementing sound and light shows within a casino. Environmental sound and light effects within a casino immerse a wagering game player ("player") in the gaming experience by stimulating the player's senses. Thus, the casino's stimulating environment can greatly enhance the player's experience within the casino, which can lead to greater customer loyalty for the casino. Thus, wagering game providers and casino operators are both interested in new and interesting concepts involving environmental immersion of the player in the gaming experience within a casino.

Figure 1:
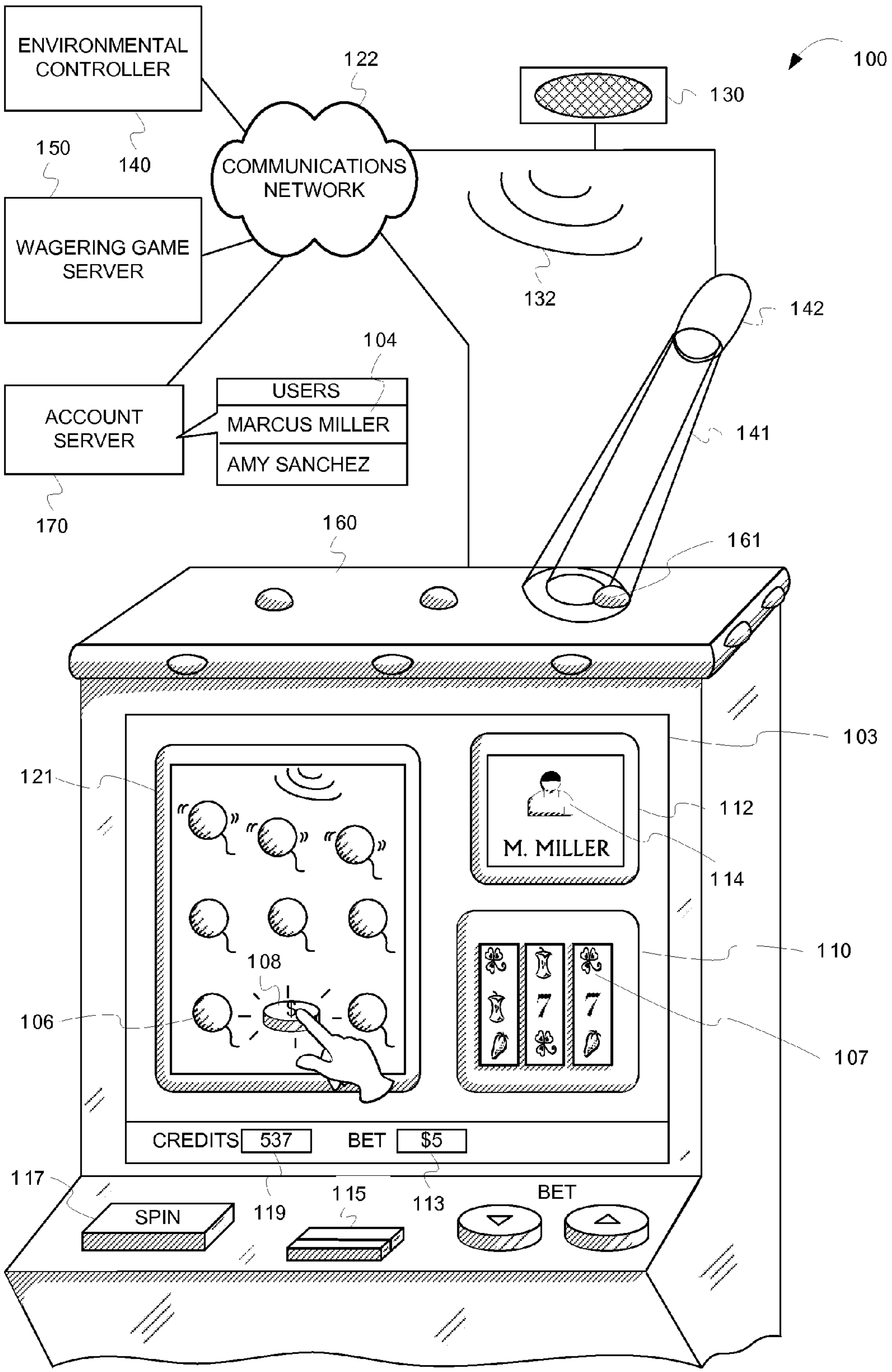
FIG. 1 is an illustration of integrating environmental light and sound conditions into wagering game animations, according to some embodiments.

FIG. 1 is a conceptual diagram that illustrates an example of integrating environmental light and sound conditions into wagering game animations, according to some embodiments. In FIG. 1, a wagering game system ("system") 100 includes a wagering game machine 160, a wagering game server 150 and an account server 170 connected via a communications network 122. Also included in the system 100 are a casino environmental sound device ("sound device") 130, a casino environmental lighting device ("lighting device") 142, and an environmental server 140, also connected via the communications network 122. The environmental server 140 can control light and sound that originate, respectively, from the lighting device 142 and the sound device 130. The account server 170 host can host a wagering game account (e.g., player account 104 for the user "Marcus Miller"). A user (i.e., Marcus Miller) can log in to the player account 104 via a card reader 115 that a player can use to swipe a player tracking card and log on to a wagering game session at the wagering game machine 160. The wagering game server 150 can provide gaming content (e.g., a slot game that includes reels 107, a bet meter 113, a credit meter 119, and a spin button 117). The wagering game machine 160 can present the gaming content within a display 103. The display 103 can include multiple windows or user interfaces (e.g., a first window 110 that includes the reels 107 for a primary game, a second window 121 that includes a set of picking elements 106 for a secondary bonus game, and a third window 112 to present a player avatar 114). In second window 121, a player can select one of the picking elements 106, which can reveal a winning result (e.g., a coin 108) or a losing result.

The wagering game machine 160 can include environmental sensors 161 that can sense signals and characteristics of environmental items and activities, such as light, sound, temperature, moisture, etc. For example, the sensors 161 on the wagering game machine 160 can detect one or more properties or characteristics (e.g., distance, direction, intensity, color, etc.) of a light field that comes from a light source external to the wagering game machine 160, such as a light beam 141 that comes from the lighting device 142. For instance, the lighting device 142 is positioned above and behind the wagering game machine 160 so that the light beam 141 falls on the wagering game machine 160 from a direction above and behind the wagering game machine 160. The system 100 detects the direction of the light beam 141, via the sensors 161, and generates an animated representation of the properties of the light beam 141, such as an animated representation of the direction and intensity of the light beam 141 on animated objects (e.g., the picking objects 106) within the display 103. For example, the system 100 can generate shadows on the picking elements 106 in a way that emulates (e.g., matches, approximates, etc.) a degree of shading that would appear on physical objects of the same physical characteristics (e.g., shape, size, orientation, etc.) as the picking elements 106 if positioned in the same location as the animated objects given the direction and intensity properties of the light beam 141. The system 100 can generate an internal light source, internal to the bonus game, that emulates the location of the lighting device 142 and direction and intensity of the light beam 141. The system 100 can also utilize other characteristics of the light beam 141, such as color, heat, ultraviolet content, etc., as parameters for equivalent animated light characteristics. Further, the system 100 can present shadows on other animated objects within the display 103, such as on the reels 107, the window frames, the avatar 114, the coin 108, etc. via other light sources associated with applications that control the other animated objects. The system 100 can also dynamically detect changes to the light properties and characteristics of the light beam 141 and dynamically alter the representation of the animated light characteristics based on the changes to the light properties and characteristics.

The sensors 161 can also detect characteristics of other environmental conditions within the casino, such as sound waves 132 that originate from the sound device 130. For example, the system 132 can detect the direction of the sound waves 132 and utilize the direction of the sound waves 132 within the animations that run on the display 103. For instance, the system 100 can cause some of the picking objects 106 to move around as if the sound waves 132 move (e.g., blow, push, etc.) the picking objects 106. Specifically, the system 100 causes the picking objects to move slightly downward because the direction of the sound waves 132 originates from above the wagering game machine 160. The system 100 uses the characteristics of the sound waves 132 differently based on the properties of the animated objects. For example, the picking objects 106 are animated balloon objects and may move more easily, based on programmed physical properties of balloons or of a programmed air density of the bonus game, than other objects on the display 103. On the other hand, the reels 107 may be programmed with physical properties that make the reels 107 steady and not susceptible to movement by the sound waves 132. In other words, the system 100 can access object properties from application programming for applications that control the animated objects, and use the object properties to determine how signals and characteristics of environmental conditions for items, activities, etc. (e.g., the sound waves 132) can affect the animated objects. The system 100 can access multiple applications simultaneously (e.g., separate applications may be running on the wagering game machine 160 for the first window 110, the second window 121, and the third window 112). Further, the sensors 161 can also detect characteristics of other environmental conditions within the casino, such as air mass properties and activities, properties and activities of people, etc. and dynamically modify animations on the display 103 to emulate the other characteristics of the environmental conditions (e.g., calculating physical properties of an air mass that cause casino object reactions then generating game effects that mimic the physical properties of the air mass, or changing a color, shape, size, state, location, structure, etc. of wagering game objects based on detected air velocity, air pressure, air temperature, air humidity, air density, air opacity, and so forth).

Further, some embodiments of the inventive subject matter describe examples of integrating wagering games and environmental conditions in a network wagering venue (e.g., an online casino, a wagering game website, a wagering network, etc. using a communication network, such as the communications network 122 in FIG. 1. Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, in some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
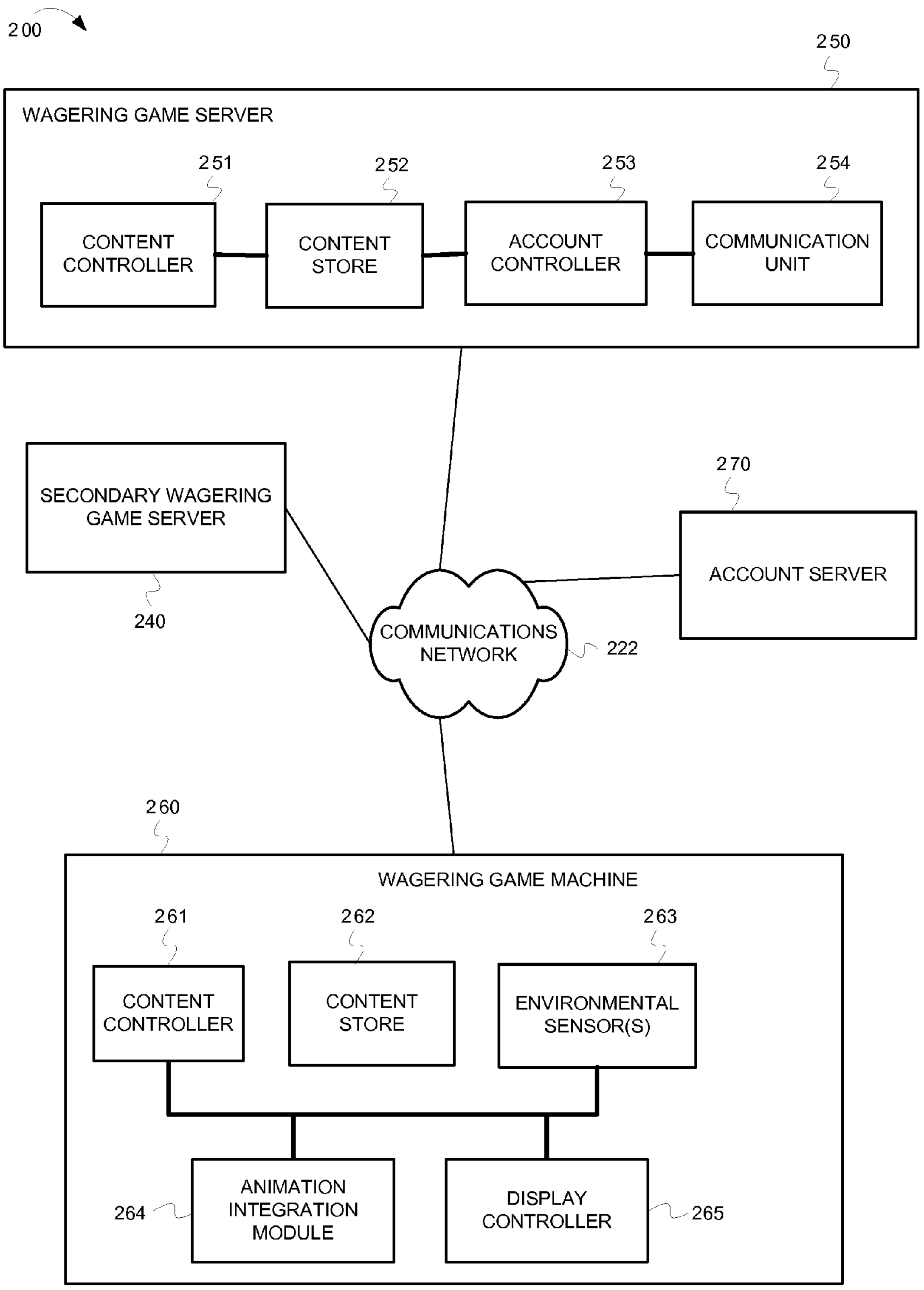
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networking networks. The account server 270 can store wagering game player account information, such as account settings (e.g., settings related to group games, etc., settings related to social contacts, etc.), preferences (e.g., player preferences regarding presentation of environmental conditions and/or objects in wagering game animations, preferences regarding environmental activity that can affect wagering games, preferences regarding award types, preferences related to virtual assets, etc.), player profile data (e.g., name, avatar, screen name, etc.), and other information for a player's account (e.g., financial information, account identification numbers, virtual assets, social contact information, etc.). The account server 270 can contain lists of social contacts referenced by a player account. The account server 270 can also provide auditing capabilities, according to regulatory rules. The account server 270 can also track performance of players, machines, and servers.

The wagering game system architecture 200 can also include a wagering game server 250 configured to control wagering game content, provide random numbers, and communicate wagering game information, account information, and other information to and from the wagering game machine 260. The wagering game server 250 can include a content controller 251 configured to manage and control content for the presentation of content on the wagering game machine 260. For example, the content controller 251 can generate game results (e.g., win/loss values), including win amounts, for games played on the wagering game machine 260. The content controller 251 can communicate the game results to the wagering game machine 260. The content controller 251 can also generate random numbers and provide them to the wagering game machine 260 so that the wagering game machine 260 can generate game results. The wagering game server 250 can also include a content store 252 configured to contain content to present on the wagering game machine 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the wagering game machine 260 and to communicate with other systems, devices and networks.

The wagering game system architecture 200 can also include a wagering game machine 260 configured to present wagering games and receive and transmit information to integrate wagering games and environmental conditions. The wagering game machine 260 can include a content controller 261 configured to manage and control content and presentation of content on the wagering game machine 260. The wagering game machine 260 can also include a content store 262 configured to contain content to present on the wagering game machine 260. The wagering game machine 260 can also include environmental sensors 263 configured to detect characteristics of at least one environmental condition in an external environment that is external to a wagering game machine in a casino. The environmental sensors 263 can also be configured to generate environmental condition data that characterizes the environmental condition in the external environment. The wagering game machine 260 can also include an animation integration module 264 configured to receive the environmental condition data from the at least one environmental sensor and generate an animated wagering game effect, using the environmental condition data, that affects one or more wagering game objects within a wagering game animation in a way that emulates the environmental condition. The wagering game machine 260 can also include a display controller 265 configured to present the animated wagering game effect as part of a wagering game presentation for a wagering game application.

The wagering game system architecture 200 can also include a secondary wagering game server 280 configured to provide content and control information for secondary games and other secondary content available on a wagering game network (e.g., secondary wagering game content, promotions content, advertising content, player tracking content, web content, etc.). The secondary wagering game server 280 can provide "secondary" content, or content for "secondary" games presented on the wagering game machine 260. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa.

Each component shown in the wagering game system architecture 200 is shown as a separate and distinct element connected via a communications network 222. However, some functions performed by one component could be performed by other components. For example, the wagering game server 250 can also be configured to perform functions of the animation integration module 264, the display controller 265, and other network elements and/or system devices. Furthermore, the components shown may all be contained in one device, but some, or all, may be included in, or performed by, multiple devices, as in the configurations shown in FIG. 2 or other configurations not shown. For example, the account manager 253 and the communication unit 254 can be included in the wagering game machine 260 instead of, or in addition to, being a part of the wagering game server 250. Further, in some embodiments, the wagering game machine 260 can determine wagering game outcomes, generate random numbers, etc. instead of, or in addition to, the wagering game server 250.

The wagering game machines described herein (e.g., wagering game machine 260) can take any suitable form, such as floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
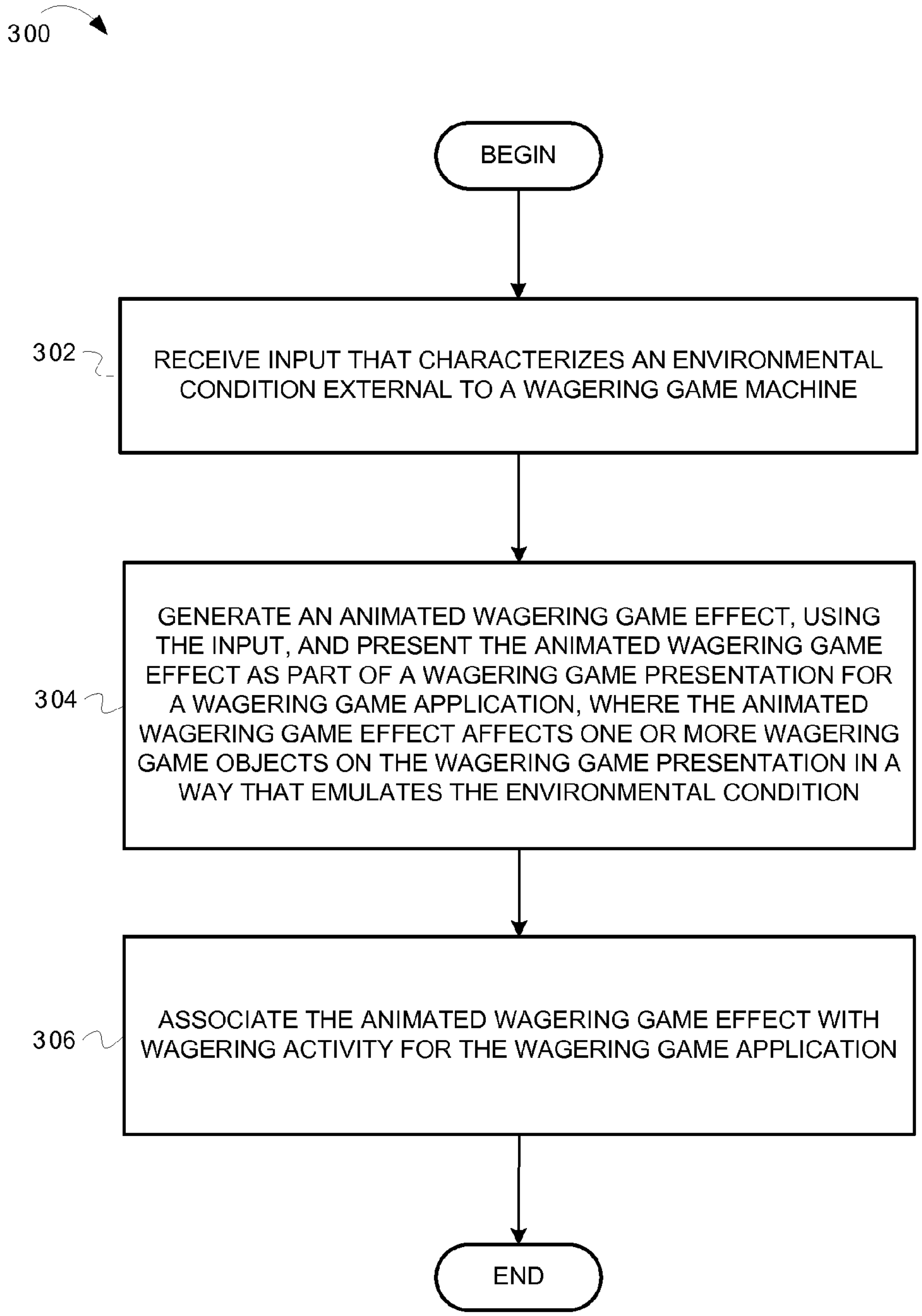
FIG. 3 is a flow diagram 300 illustrating integrating environmental conditions into a wagering game animation, according to some embodiments.
Figure 4:
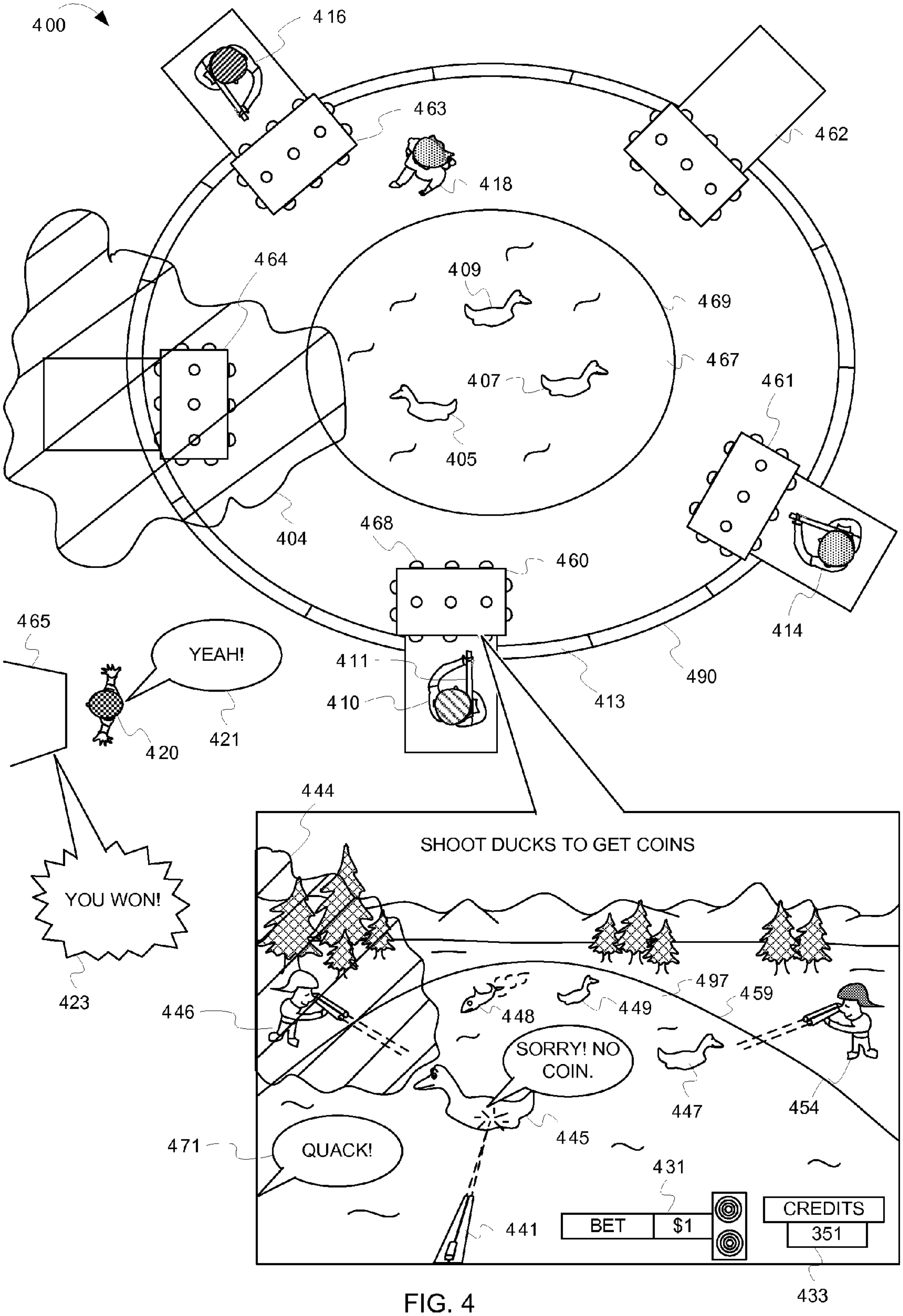
FIG. 4 is an illustration of integrating environmental activities and objects into a wagering game animation, according to some embodiments.

FIG. 3 is a flow diagram ("flow") 300 illustrating integrating environmental conditions into a wagering game animation, according to some embodiments. FIGS. 1 and 4 are conceptual diagrams that help illustrate the flow of FIG. 3, according to some embodiments. This description will present FIG. 3 in concert with FIGS. 1 and 4. In FIG. 3, the flow 300 begins at processing block 302, where a wagering game system ("system") receives input that characterizes an environmental condition external to a wagering game machine. The system can receive the input from sensors that detect physical properties, characteristics, or activities of an environmental object, or objects, which result in the environmental or "real world" condition. For example, the sensors can detect or measure events, properties, characteristics, etc. that occur to, characterize, or are caused by, an environmental object related to the environmental condition. In other words, the sensors detect, or receive, the input, which characterizes a real-world environmental condition, such as a real-world effect, a real-world object appearance, a real-world state, a real-world event, etc. made by, or of, the external environmental object. The sensors then generate environmental condition data that characterizes the environmental condition in electronic signal format. The sensors can include, but are not limited to, cameras (e.g., video, picture, night-vision, etc), infrared sensors, ultrasonic sensors, radio frequency tracking sensors, laser tracking sensors, wireless application protocol sensors (e.g., Bluetooth), pressure sensor pads, global positioning system (GPS) sensors, gyroscopic sensors, motion sensors, humidity sensors, temperature sensors, scent detection sensors, velocity sensors, etc.

Examples of characteristics of an environmental condition, or in other words, examples of input that the sensors can detect and to which the generated environmental condition data can relate, include, but are not limited to the following:

- light directionality, locality, intensity, color, etc. (e.g., light shining on particular areas of a casino floor, spot-light direction, etc.);
- sound directionality, locality, intensity, volume, etc.;
- smoke or fog density, color, temperature, etc.;
- camera perspectives;
- smells;
- wind speed, pressure, temperature, etc.;
- weight or other manually applied forces (e.g., weight on floor, pressure on buttons, weight on seats, pressure on armrests, pressure on seat backs, etc.);
- position and/or movement of objects, such as a person (e.g., an audience member, a casino patron, a casino waitress or other staff member, etc.), a playing instrument (e.g., a wand), a portable device (e.g., a handheld phone, a mobile wagering game machine, etc.), and so forth;
- position and/or orientation of a wagering game machine cabinet or player station; and
- out-of-casino activity (e.g., a progressive win at another casino, outside weather, etc.).

In some embodiments, the environmental condition can be related to an environmental object that is not part of the wagering game machine. In other words, the environmental object can be part of the environment around the wagering game machine that exists, or functions, independent of the wagering game machine functionality (e.g., is not controlled by the wagering game machine, is not physically connected to the wagering game machine, is not electronically interfaced or in communication with the wagering game machine, etc.). For instance, the environmental object can be an object that is in the environment around the wagering game machine, such as the player, an object belonging to the player, another wagering game machine, another casino patron, a chair, a sign, a drink, lighting devices, speakers, etc. In some embodiments, the environmental object may be an air mass (e.g., a fog bank) or a liquid (e.g., a fountain, a pond, etc.). In some embodiments, the system can detect an environmental condition that includes, or is caused by, an environmental effect (e.g., a detectible activity, an emission, a physical response to stimuli, etc.) generated by, or occurring to, the environmental object. Examples of environmental effects may include, but are not limited to, a light shining from a light fixture, a sound originating from a wagering game machine or person, a motion performed by a casino performer, a scent originating from a flower, etc. In some embodiments, the environmental condition includes lights, sounds, moisture, heat, or other characteristics that originate from, or are caused by, the environmental object. In some embodiments, the environmental condition can be related to an environmental object that is not physically or electronically connected to the wagering game machine, but that can still be used as a playing instrument or game related device. For instance, the environmental object may be a prop that a player uses to perform game related activity, such as a stick or a ball, but that does not itself provide electronic signals directly to the wagering game machine. Further, in some embodiments, the environmental object or environmental condition can be within a casino environment or external to the casino, such as objects that are outside of the casino, signals outside of the casino, lights and sounds outside of the casino, weather conditions outside of the casino, etc.

The flow 300 continues at processing block 304, where the system generates an animated wagering game effect, using the input, and presents the animated wagering game effect as part of a wagering game presentation for a wagering game application, where the animated wagering game effect affects one or more wagering game objects on the wagering game presentation in a way that emulates the environmental condition. In some embodiments, the system can analyze the input provided by the sensors and determine the environmental condition (e.g., determine the external real-world event, effect, characteristic, etc.), that the input is describing, or characterizing. The system can then generate an animated effect that emulates the environmental condition characterized by the input and can integrate, incorporate, synchronize, etc. the animated effect into a presentation for the wagering game application.

Examples of animated effects may include, but are not limited to, the following:

- weather effects—rain, snow, night, day, wind, fog;
- reflection (e.g., via reflection mapping);
- lighting types and properties—ambient, spot, point, directional;
- material properties;
- effects—glow, after-image, high dynamic range, (e.g., over/underexposure), bloom, black and white, depth of field, etc.;
- texture manipulation;
- object manipulation—location, orientation, scale;
- programmatic bone control;

- sounds and sound effects—echo, amplification, reverb;
- physics—applying forces to an object to make it move;
- camera perspective and/or movement; and
- liquid (e.g., water, lava, etc.) effects.

In some embodiments, the animated wagering game effect is a virtual, or three-dimensional (3D) effect that emulates a real-world three-dimensional environmental condition. For instance, the system can determine at least one animation object construction rule for the wagering game application that relates to the environmental condition data. The system can further determine a three-dimensional effect that the environmental condition would have on one or more wagering game objects in a wagering game animation based on an application of the environmental condition data to the at least one animation object construction rule. The system can also apply the three-dimensional effect to at least one of the one or more wagering game objects in the wagering game animation. Some examples of three dimensional effects include, but are not limited to, the following.

- Shadows. The system can create shadowing in the animated effect that dynamically detects, matches, and tracks the direction and intensity of external lighting events. The system can cause the animated shadowing to move and change direction or intensity as the external lighting changes and moves.
- Gradients. The system can also dynamically detect, match, and track the color of an external light, such as a color of a spotlight that is shined on a player. The system can determine the color of the external light, recreate the lighting color in the game, and adjust the coloring based on three-dimensional geometries of animated items within the game, to generate variances in color contrast, gradient, etc. on the animated items.
- Depth perspective. The system can adjust real-time 3D layering and/or physics that are incorporated into a two-dimensional version of an animation to cause the appearance of two dimensional items to be three-dimensional in perspective, movement, etc.
- Reflection: The system can create reflective elements (e.g., surfaces) within the game that appear to reflect images of external objects around the player or the wagering game machine. One example of reflections is reflection mapping, where an item within the animation generates reflections of objects around it by placing the imagery of the surroundings onto a specific shape (e.g., stretches reflections onto a spherical object or a cubed object within the game animation). The system can cause the reflections on the item to be reflections of the real-world objects that are external to the wagering game machine. For example, the system can take pictures in different directions from the wagering game machine, (e.g., left, right, and front) and map 3D reflections within the game animation to the camera images. The system can also cause reflections of animated light and animated objects that are within the animation and not necessarily external to the wagering game machine (e.g., create a composite reflection of spinning game reels and an animated light source, which are internal to a wagering game animation, as well as an image of the player and an external spot light, which are external to the wagering game animation, on a reflective sphere within the wagering game animation).

In some embodiments, the system can capture input for use in three-dimensional animated effects via equipment that detects a player's perspective of the animation then alters the animation based on the player's perspective. For example, the system can use auto stereoscopic tracking, which watches the movement of the face and/or eyes of a player. The system can then use data from the auto stereoscopic tracking to manipulate the view of the animation, or implement 3D effects, based on the player's movement. In some embodiments, the system can utilize special devices that expand or adjust the presentation of the 3D effect as perceived from the player's perspective (e.g., tri-vision displays that can blank out certain sections of the display, goggles and/or night vision glasses that provide more of a view of the 3D effect, etc.).

In some embodiments, the system can receive input that characterizes a visual perspective of a casino environment and one or more casino objects in the casino environment. The system can generate an animated wagering game setting that emulates an appearance of the casino environment based on the visual perspective characterized by the input. The system can also generate one or more animated wagering game objects that emulate an appearance of the one or more casino objects in the casino environment based on the visual perspective characterized by the input. The system can also present an animated perspective of the one or more animated wagering game objects within the animated wagering game setting in a way that emulates the visual perspective of the one or more casino objects in the casino environment. The system can further determine a change in the visual perspective of the casino environment and the one or more casino objects in the casino environment and present a corresponding change in animated perspective of the one or more animated wagering game objects within the animated wagering game setting in way that matches the change in the visual perspective. In some embodiments, the visual perspective is based on an orientation a wagering game machine in relation to the casino environment and the one or more casino objects, and the system can determine the change in the visual perspective by determining a change in the orientation of the wagering game machine in relation to the casino environment and the one or more casino objects. In some embodiments, the one or more casino objects are mobile (e.g., movable, capable of changing position or reorienting, etc.) within the casino environment and the system can determine the change in the visual perspective by determining a change in an orientation, position, etc. of the one or more casino objects in relation to a sensor on a wagering game machine that captures the visual perspective. In some embodiments, the system can also capture a player's perspective of a wagering game machine display and use the player's perspective, to change the animated perspective.

The flow 300 continues at processing block 306, where the system associates the animated wagering game effect with wagering activity for the wagering game application. For example, the animated wagering game effect can illustrate wagering activity performed via player input, such as inserting money into the wagering game machine, performing actions that result in wagering outcomes, indicating bet amounts, participating in audience activity that results in bet modifications or gaming results, etc. In one example, a player may make a movement with an instrument that initiates a wagering game result or outcome within the wagering game.

FIGS. 1 and 4 illustrate examples of the flow 300 according to some embodiments. FIG. 1 was previously described. FIG. 4 will now be described. In FIG. 4, a wagering game system ("system") 400 includes a plurality of wagering game machines 460, 461, 462, 463, and 464 ("wagering game machines 460-464). The wagering game machines 460-464 are part of a group, or community, gaming platform that utilizes real world elements in a community wagering game. In some embodiments, any one of the wagering game machines 460-464 can perform operations independent from each other. In other embodiments, however, the wagering game machines 460-464 can work in conjunction with each other. In some embodiments, as described further above, any, or all, of the wagering game machines 460-464 can include any or all of the elements described above in FIG. 2. The wagering game machines 460-464 can rotate on their axes, at least partially, and move sideways along a track 413. Players 410, 414, and 416 associated with the wagering game machines 460, 461, and 463 can control the movement of the wagering game machines 460, 461, and 463, and can change the orientation of the wagering game machines 460, 461, and 463 in relation to a central stage 467. The central stage 467 can include real-world props (e.g., ducks 405, 407, and 409) that are used as part of the community wagering game. Wagering game machine 460 presents a display 403 of a game animation 440 for the community wagering game. The wagering game machine 460 includes sensors 468 that can detect actions or properties of objects that surround the wagering game machine 460. For instance, the sensors 468 can detect movement and positions of the ducks 405, 407, and 409 relative to a boundary 469 of the central stage 467. The system 400 can then generate animated ducks 445, 447, and 449 in the game animation 440 with movement and positions relative a boundary 459 of an animated lake 497. The system 400 can animate the relative positions of the animated ducks 445, 447, and 449 to the boundary 459 in a way that is proportional to the relative positions of the ducks 405, 407, and 409 to the boundary 469 of the central stage 467.

The system 400 can also use the sensors 468 to detect actions or properties of an air mass, such as a fog effect 404, and use the actions and properties of the fog effect 404 as part of the game animation 440 or part of game activity that occurs within the community game. For example, the system 400 can present an animated fog bank 444 within the game animation 440 that follows the movement of, or possesses other characteristics of, the fog effect 404.

The system 400 can also use the sensors 468 to detect actions and characteristics of people, such as a casino patron 418, and use the actions and properties of the casino patron 418 as part of the animation 440 or part of game activity that occurs within the community game. For example, the system 400 can present a character (e.g., the fish character 448) in the game animation that follows the movement of the casino patron 418. For instance, as the casino patron walks along a specific path, the system 400 can cause the fish character 448 to follow a similar movement path within the game animation 440. The movement of the fish character 448 may have an effect on the community game, for instance, by either randomly scaring duck character's away from, or attracting ducks characters toward, the fish character 448. The scaring or attracting of ducks may improve odds of winning for one or more players. Thus actions performed by the casino patron 418 can affect game related wagering functionality (e.g., outcome determinant activity), even when the casino patron 418 is unaware that their actions are affecting game activity.

The system 400 can also use the sensors 468 to detect actions and properties of players, such as players 410, 414 and 416, who play together in the community game. For instance, the system 400 can detect the position and movement of the players 414 and 416, and their accompanying wagering game machines 461 and 463, relative to the player 410 and his wagering game machine 460. The system 400 can present animated characters 454 and 446, which represent, respectively, the players 414 and 416 in perspective. In other words, the system 400 positions the animated characters 454 and 446 in locations around the boundary 459 of the animated lake 497 to emulate the relative positions of the players 414 and 416 to the boundary 469 of the central stage 467. When one of the player's 414 or 416 perform activities in the community game, the system 400 can generate animations that emulate their activities within the game animation 440 by animating equivalent actions by their counterpart animated characters 454 and 446. The system 400 can also detect movement of instruments or activities performed by the player 410. For example, the sensors 468 can detect movement of a prop gun 411 by the player 410 and, equivalently, move an animated gun 441 within the game animation 440. As the player 410 shifts positions, the system 400 can cause the game animation 440 to adjust to the player's perspective and present a three-dimensional view of the game animation 440 according to the player perspective facing the display 403 of the wagering game machine 460.

The actions by the players 410, 414, and 416 can affect game activity that occurs within the community game from the perspective of each other. For example, the players 410, 414, and 416 can compete to shoot the animated ducks 445, 447, and 449. If one player shoots a duck, the system 400 can provide rewards to the player that shoots a specific duck and possibly provide penalties to the other player's that do not shoot the specific duck. In other embodiments, however, the system 400 can show the activity and results of the players 414 and 416, but their results would not affect the results of the player 410. Further, the system 400 can randomly choose ducks to have rewards and/or penalties. The system 400 can also detect patterns of activities performed by the players 410, 414, and 416 and anticipate their activity based on their patterns. The game animation 440 for the community game can include wagering, such as betting on whether a duck yields a coin. As a result, the game animation 440 can provide a bet meter 431 for the player 410 to shoot at, or touch, to increase or decrease a bet amount. The game animation 440 can also include a credit meter 433 linked to a wagering game account for the player 410. In another embodiment, the game animation 440 can be a bonus game, which may not require betting amounts, but that may be based on previous betting patterns or settings associated with a primary wagering game (e.g., the duck hunt game may be a bonus game that the players 410, 414 and 416 play momentarily between wagering sessions of a community slot tournament or a poker match).

In some embodiments, the system 400 can focus on only environmental conditions within a bounded playing area (e.g., focus only on the area enclosed by a perimeter 490). In other embodiments, however, the system 400 can focus on environmental conditions outside of the bounded playing area to any part of the casino that can be sensed by the sensors 468, or by remote sensors in other locations of the casino. For instance, in some embodiments, the system 400 can use the sensors 468 to detect sounds events that are nearby the wagering game machine 460 and use the sound events as part of the game animation 440 or part of game activity that occurs within the community game. For example, an additional player 420 plays at a wagering game station 465 (e.g., a community gaming table, a card table, a wagering game machine, etc.) and wins a game. The player 420 makes a loud player sound 421 while at the same time the wagering game station 465, or speakers associated with the wagering game station 465, make a loud congratulatory sound 423. The wagering game machine 460 can detect the loud player sound 421 and/or the loud congratulatory sound 423 and generate an effect in the game animation 440 that approximates or reacts to the loud player sound 421 and/or the loud congratulatory sound 423. For example, the system 400 can replace the external sound events with a different sound within the game animation 440, such as a quacking sound 471 that can either repel or attract animated ducks 445, 447 or 449 towards, or away from, a point of view of the player 410.

It should further be noted that the elements described in conjunction with FIG. 4, or elsewhere herein, may be implemented using mobile wagering game machines, e-tables, etc. For example, instead of a group of wagering game machines 460-464, the players 410, 414, and 416 may be seated at player stations of an e-table. The player stations of the e-table could have sensors that detect activities of players, patrons, props, wind, or other environmental conditions. The player stations could present animations on displays associated with the player stations that emulate the real-world objects and/or conditions as part of a community game played at the e-table. For example, the player stations could detect movement of a roulette ball at a roulette wheel and generate at each player stations a computerized animation showing an animated roulette ball that follows the motion of the physical roulette ball.

Additional Example Embodiments

According to some embodiments, a wagering game system ("system") can provide various example devices, operations, etc., to integrate wagering games and environmental conditions. The following non-exhaustive list enumerates some possible embodiments of implementing characteristics of environmental objects and/or environmental conditions (e.g., events, states, activities, etc.) into wagering game animations:

External lighting events.

In some embodiments, the system can synchronize animated lighting effects in a wagering game animation with lighting effects presented on casino-floor lighting devices (e.g., spot lights, ambient lights, directional lights, rotating lights, ultraviolet lights, neon lights, etc.). In some embodiments, the system can utilize sensors to detect the lighting effects presented on the casino-floor lighting devices. In other embodiments, however, the system can coordinate with a casino show control server, or any other casino network device that controls lighting (e.g., an environmental controller, a DMX controller, etc.), to receive light show presentation instructions that will present lighting effects on specific casino-floor lighting devices near a wagering game machine. Thus, the wagering game machine can know what lighting effects will be produced before they are produced on the casino-floor lighting devices. Consequently, the wagering game machine can generate the 3D lighting effects in the wagering game animation and present it at the same time that the casino-floor lighting devices present the corresponding light effects.

Air mass or other weather related external events.

In some embodiments, the system can detect object reactions to unseen air movements or properties. For example, the system can detect a direction of a wind blast that occurs to the external environment. The system can then emulate the wind blast within a wagering game animation by causing game objects to appear to move in the direction of the wind blast (e.g., programming physics can blow animated ships across an animated lake in a way that emulates a wind blast in the casino or outside the casino). In another example, the system can detect a temperature or moisture content of air and generate corresponding animated game effects that react to animated air temperature or moisture. For instance, the system can detect an air temperature and present changes to objects within the game animation as changing color to red for hotter or blue for colder, or causing items to appear to wilt or freeze. In another instance, the system can detect a that an external air mass has a high humidity content and the system can present an animated version of the humid air mass in the game animation, which can leave an exaggerated mist layer on objects within the game animation.

In some embodiments, the system can detect fog effects in the external environment and emulate the fog effects within the game animation. For example, the system can generate an animated fog that obscures objects within the game. The system can utilize the obscuring of the game items as part of the game. The system can also utilize the obscuring of the game items to generate a result for the game. For example, the system can use fog in a game to obscure reels or elements of a reel in a slot game. When the fog lifts in the external environment, the fog can lift within the game animation, but could change the appearance of the reel elements (e.g., change a slot reel element from a cherry to a strawberry, which may affect the payout of the slot game). In another example, the fog may obscure items in a bonus game, such as picking elements, which may help the player's chances of getting a better game outcome or hurt the player's chances of getting a better outcome. In some embodiments, the system can detect that the player uses a player device or instrument (e.g., fog lamp, flashlight, fan) or activates a player stored object (e.g., a fan object stored in an inventory associated with the player's wagering game account) to counteract the fog. Depending on the player's use of the player device, instrument, or stored object, the system can affect the animated presentation of the fog, even differently from how the fog may still appear in the external environment. In some embodiments, the system can prompt the player to play faster to avoid detrimental effects of fog. Thus, the player sees the fog coming and speeds up play to avoid the detrimental effect that would occur within the game animation by an animated fog effect.

In some embodiments, the system can detect weather events outside of a casino and present, on the game animation, an appearance of what is occurring outside of the casino. The system can detect the location of the sun in the sky during the day and make the lighting in the game appear to be what the lighting is outside of the casino. The system can detect rain, snow, or inclement weather, and represent that weather within the game. The system can alter game rules or game outcomes based on the weather conditions (e.g., falling snow outside can make game conditions slippery, which may affect the duration of a slot reel spin, the movement of game characters, etc.). In some embodiments, the system can also detect and use external weather effects similar to how the system detects and uses the fog effects, described above, within a wagering game application.

Environmental objects.

In some embodiments, the system can detect environmental objects (e.g., people, walls, other machines, etc.) and present the environmental objects in the game as the environmental objects appear in the external environments or the system can alter their appearance. For example, the system can generate an animated wagering game object that looks similar to an environmental object external to the wagering game machine. The system can then alter the appearance of the animated wagering game object to comply with one or more game conditions of the wagering game animation. For example, the system can alter the appearance of the detected environmental objects using different game effects, such as altered perspective (e.g., creating altered reflections of the environmental objects on game items), altered opacity (e.g., making environmental objects appear as translucent game items), altered texture, color, or shading (e.g., changing the appearance of an environmental object's clothing, skin textures, wall and floor coverings, furniture décor, etc. according to a pre-specified game theme to generate game items that look like the environmental objects in structure but have skins and textures that match the game theme's colors and skins), and added effects (e.g., adding a glow, a fire effect, a freezing effect, a sparkle, etc. to animated game objects that represent environmental objects).

In some embodiments, the system can also detect and use external bubble or balloon effects that fall from a casino ceiling and present animated correlates (e.g., animated boulders) in the game, which follow the movement of the balloons or bubbles.

Events in other locations.

In some embodiments, the system can detect an external entertainment event (e.g., sporting event, musical concert, etc.) and present the game animation as occurring within the entertainment event. In some embodiments, the system can incorporate television or streaming video of the entertainment event into the wagering game animation (e.g., present streaming video onto a rotatable rectangle within the game animation).

In some embodiments, the system can capture video of other locations or settings outside of the casino, like a lake setting, and present the lake setting within the game animation.

Orientation of a wagering game machine.

In some embodiments, the system can present a 3D representation of external environments that surround wagering game machines. The system can change perspectives (e.g., depths, textures, shading, etc.) based on the perspective of the wagering game machine to one or more environmental objects or locations. In some embodiments, a wagering game machine can have a digital compass that knows the direction that the wagering game machine is facing in relation to a group of wagering game machines that are all playing a group game. For example, in FIG. 4, the wagering game machines 460-464 surround a central location (i.e., the central stage 467), which represents a lake. The display 430 of wagering game machine 460 shows the animated lake 497 with a game perspective that matches the perspective of the wagering game machine 460 relative to the central stage 467. Further, the wagering game machines 460-464 can pivot on their stands and slide on their tracks and sense their relative positions to the central stage 467. The wagering game machines 460-464 can alter the appearance of game imagery, or rather, alter the appearance of the environmental objects within the game animations, based on the position and orientation of the wagering game machine 460-464.

Actions by and/or properties of people (e.g., players, patrons, audience members, performers, etc.).

In some embodiments, the system can detect that a player is blowing out candles on a screen and the system can cause the candles to blow out. Sensors on the machine can detect direction, sound and/or force of the blowing motion.

In some embodiments, the system can detect a player blowing into a sensor to emulate the use of a wind instrument. The system can then animate and produce sound for an animated game instrument.

In some embodiments, the system can detect a person (audience member) in the background that is jumping up and down and select the person to be included in, or participate in, a game. Spotlights externally can shine on the selected person. The system can detect an image of the selected person and illustrate the selected person walking into the game. The audience members can use devices or launch objects that the system could integrate into game play.

In some embodiments, the system can track a person's throwing or launching of a real-world object at a target (e.g., throwing a ball at a wall, flipping a coin into a bucket, etc.), and incorporate the action into a game animation.

In some embodiments, the system can sense the motion and activity of a performer (e.g., a dealer, a Mr. Monopoly, etc.) or other third party, that is trained to use specific implements and devices or to make specific motions, that will affect a character in the game or that affect the game in specific ways.

In some embodiments, the system can sense that a player rocks back and forth on a chair and a character in a game rocks back and forth.

In some embodiments, the system can sense a player temperature, weight, pressure, or any other detectable characteristics, property or activity of the player, and then incorporate those characteristics into game animations.

In some embodiments, the system can track a location of a server and present the server on a game animation.

In some embodiments, the system can detect a player's alcohol level on their breath and can affect the game activity within the game application.

In some embodiments, the system can detect and gauge degrees of pressure that a player applies to a pressure sensitive button, and can cause a game animation to respond accordingly. For example, the pressure sensitive button can be used in a group setting where groups of players have to coordinate their movements (e.g., a rowing game where two sides of players have to coordinate their rowing motion). The use of the pressure sensitive button can evolve during the game based on a scenario or episode.

In some embodiments, the system can detect activity by groups of players and integrate that activity into a game animation. For example, the system can prompt a group of players across different tables to do the wave. The system can detect the players movements while performing the wave and incorporate the movement into a game animation.

In some embodiments, the system can incorporate activities performed by one player into another player's game animations. For instance, the system can cause objects manipulated by one player to appear to enter another player's display (e.g., a first player knocks down a prop-wall which causes a brick to appear in a second player's display, or light from a first player's prop torch comes on to a second player's display).

In some embodiments, the system can present a game animation that makes some portion of an enclosure, or cabinet, of a wagering game machine appear transparent, or see through, when looking at the display of the wagering game machine. In some embodiments, the system can present a see-through image that presents a player sitting opposite to another player on another wagering game machine, so that players can see images of each other even though the respective machinery of the wagering game machines may be in between them.

In some embodiments, the system can detect a winning player's motions/activities in another location (e.g. in a different city or state) and the system emulates that player's activity in a game animation.

In some embodiments, the system can present a relative position of players based on their performance in a slot tournament. For instance, the system can present a race-track position view on a game animation, which presents a photographic mash-up view of players sitting in animated cars on the race-track.

In some embodiments, the system can track the motion of a massive multiplayer character (e.g., a Player's Life™ character) in an environment in the virtual world and emulate the movements or characteristics of that character in a wagering game animation.

Player devices and/or instruments.

In some embodiments, the system can detect the movement and orientation of an external device used by the player and present a game reaction based on movement of the external device. For example, a player can use a flashlight device and point the flashlight into a wagering game machine screen. The system can generate a 3D effect of a light appearing to come out of the flashlight onto the screen within the animation, to illuminate objects within the animation. In some embodiments, the flashlight device can actually produce light and the system can detect the light. In other embodiments, however, the system can take the spatial orientation of the flashlight device and generate the animation of the light beam based on the orientation of the flashlight device. In some embodiments, the flashlight device does not provide electronic input to the wagering game machine (e.g., is not electronically connected to the wagering game machine to provide electronic location or orientation data), but the wagering game machine senses the position and orientation via sensors. In some embodiments, the player can use their finger, a cell phone, or any other personal item to simulate a flashlight, a gun, or any other device.

In some embodiments, the system can scan in a lucky charm that belongs to a player (e.g., a rabbit's foot) and present it in the game. The lucky charm can become the player's device to control the game.

Sound events.

In some embodiments, the system can detect ambient noise and alter it to make it sound like it would be in the environment of the game animation. For example, the system can capture ambient noise around a wagering game machine, alter it with an echo effect, and present it in a game animation that occurs within a cavern. The echo effect makes the ambient noise sound as it would in the cavern.

In some embodiments, the system can use noises around a wagering game machine as activating events within the game (e.g., a loud celebratory sound outside of the game could cause objects to grow into bonus points or wake up characters within the game animation). The system can receive input of a sound event within a casino produced by an external sound source external to a wagering game machine. The system can determine from the input at least one external sound property for the sound event produced by the external sound source, and generate an external sound property value that indicates a measure of, or characterizes, the external sound property. The system can then correlate the at least one sound source property with at least one game-physics control factor of a wagering game application running on the wagering game machine. The system can correlate in a way that a game-physics control factor value emulates an external sound property value. The system can apply the game-physics control factor to the wagering game objects and generate an animated reaction for the wagering game objects to the game-physics control factor in a way that appears as if the external sound event affected the wagering game objects. For instance, the system can generate a game effect that affects the wagering game objects in a way that appears as if the external sound event affected the wagering game objects. The system can generate a game stimulus or game event, and use the game-physics control factor to control some part of a the game event (e.g., via a programming function that controls the game event), which causes the game event to interact with the wagering game objects causing an animated response by the wagering game objects. The game-physics control factor value can relate to game-physics factors including game mechanics (e.g., force, momentum, energy, friction), game thermal dynamics (e.g., heat transfer, state change, etc.), and game electromagnetism (e.g., conductivity, resistivity, etc.) that control wagering game objects within the wagering game application. In one example, the external sound property is an external sound direction of the sound event from a location of speakers that generate the sound event relative to the wagering game machine. The wagering game machine runs a wagering game application that uses a wind control module (e.g., a wind control function, a wind control rule set, etc.) that generates a wind blast stimulus ("wind blast") within the wagering game application and controls the wind blast using wind control factors (e.g., wind force factors, wind direction factors, wind temperature factors, etc.), or programmatic factors that control the physical properties of the wind blast within the wagering game application. The wind control module can generate the wind blast within the game using pre-programmed wind control factors. However, the wind control rule set can also receive parameter values for the wind control factors from the system based on system conditions. For instance, the system can substitute one or more of the wind control factors with external sound properties. As an example, the wind blast may require a direction factor to direct the wind blast within the wagering game application. The system can pass an external sound direction value (a value for the external sound property that characterizes the direction of the sound) into the wind control module to use as the direction factor of the wind blast. The wind control module generates the wind blast according to the wind blast direction, and causes the gaming objects to react to the wind blast in a way that looks like it is reacting to the sound event. In other words, the system generates a wind blast direction value in the wagering game animation that matches a sound field direction value on the casino-floor, and uses the wind blast direction value to move animated game objects in a way that visually appears within a wagering game animation as if the animated game objects were moved by the sound event. Or, more generally, the system creates a value for a game-physics control factor that emulates an external sound property value, and uses the value for the game-physics control factor to affect wagering game objects in a way that appears as if the sound event affected them. FIG. 1 illustrated an example by using a direction of an audio field (e.g., sound waves 132) to emulate a direction of a wind blast that pushes the picking elements 106 downward. The picking elements 106 are balloon objects and therefore react easily to wind blasts according to game physics. FIG. 4 illustrates another example by detecting a sound event (e.g., the loud player sound 421), and generating a corresponding sound event (e.g., the quacking sound 471) for the game animation 440, which causes a reaction with the animated duck 445 (e.g., causes the animated duck 445 to move away from, or toward the quacking sound 471, etc.).

Reactionary events.

In some embodiments, the system can utilize a game activity presented in a game animation to generate a simulated external, real-world event that matches the game activity. For example, a fish jumps in a game animation, and a wagering game machine blows a physical puff of air onto the player and/or sprays the player with a mist to emulate the jumping fish. The system can also respond to player input with external stimuli or effects. For example, if a player rocks in their chair to emulate a forward moving motion (e.g., rowing, skiing, motion, skydiving, etc.) the system can generate a wind flow from fans or compressed air containers that blow on the player to indicate the character's speed in the game. In another embodiment, the system can provide a bonus that propagates to players as a wave. For instance, as a table gets lucky, or is winning more, the system can generate a temperature raise, or present a color change (e.g., changes the color of the table to red), or presents an expansion of fog, bubbles, or other physical effects.

Additional Example Operating Environments

This section describes example operating environments, systems and networks, and presents structural aspects of some embodiments.

Wagering Game Machine Architecture

Figure 5:
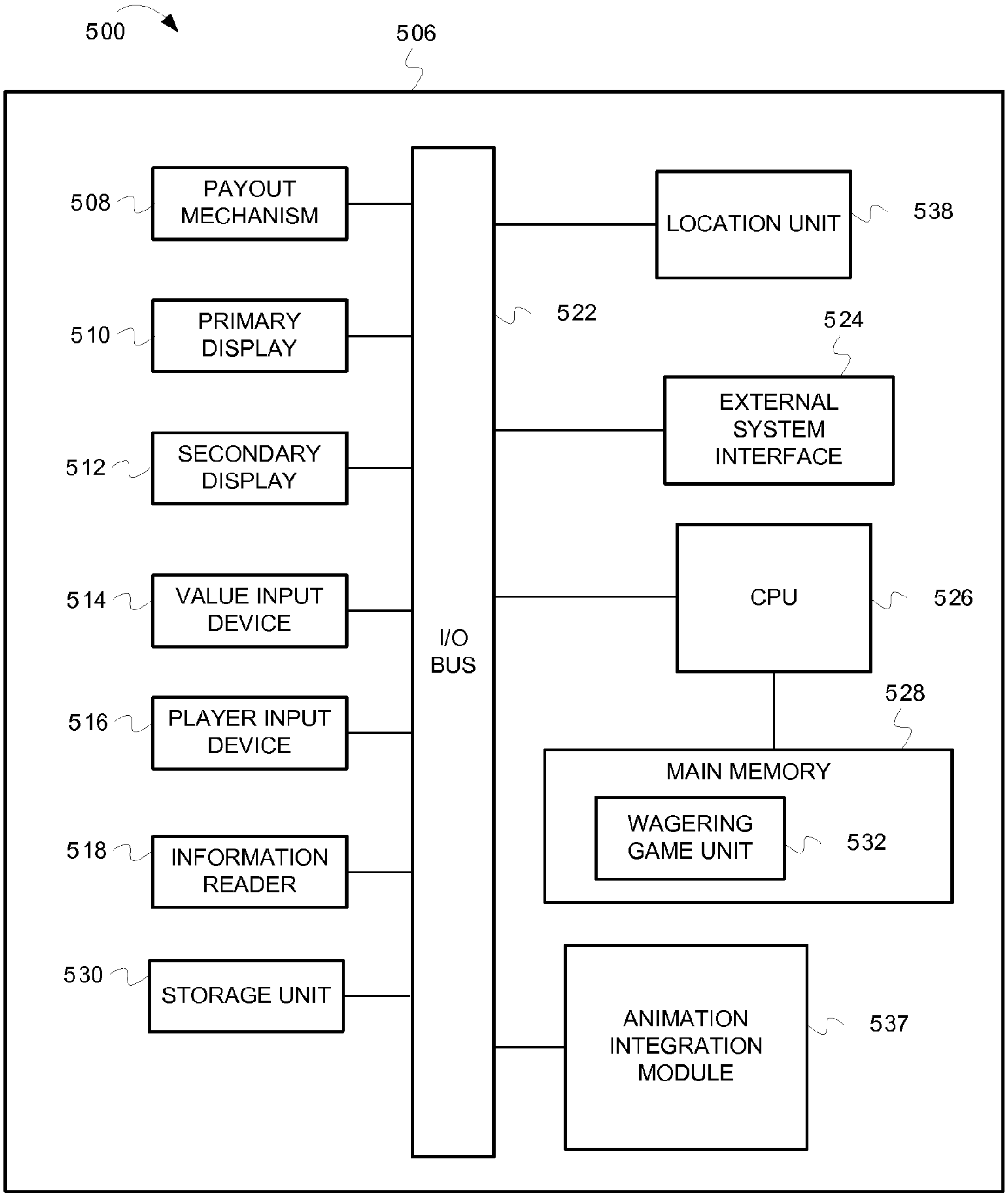
FIG. 5 is an illustration of a wagering game machine architecture 500, according to some embodiments.

FIG. 5 is a conceptual diagram that illustrates an example of a wagering game machine architecture 500, according to some embodiments. In FIG. 5, the wagering game machine architecture 500 includes a wagering game machine 506, which includes a central processing unit (CPU) 526 connected to main memory 528. The CPU 526 can include any suitable processor, such as an Intel® Pentium processor, Intel® Core 2 Duo processor, AMD Opteron™ processor, or UltraSPARC processor. The main memory 528 includes a wagering game unit 532. In some embodiments, the wagering game unit 532 can present wagering games, such as video poker, video black jack, video slots, video lottery, reel slots, etc., in whole or part.

The CPU 526 is also connected to an input/output ("I/O") bus 522, which can include any suitable bus technologies, such as an AGTL+frontside bus and a PCI backside bus. The I/O bus 522 is connected to a payout mechanism 508, primary display 510, secondary display 512, value input device 514, player input device 516, information reader 518, and storage unit 530. The player input device 516 can include the value input device 514 to the extent the player input device 516 is used to place wagers. The I/O bus 522 is also connected to an external system interface 524, which is connected to external systems (e.g., wagering game networks). The external system interface 524 can include logic for exchanging information over wired and wireless networks (e.g., 802.11g transceiver, Bluetooth transceiver, Ethernet transceiver, etc.)

The I/O bus 522 is also connected to a location unit 538. The location unit 538 can create player information that indicates the wagering game machine's location/movements in a casino. In some embodiments, the location unit 538 includes a global positioning system (GPS) receiver that can determine the wagering game machine's location using GPS satellites. In other embodiments, the location unit 538 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 5, in some embodiments, the location unit 538 is not connected to the I/O bus 522.

In some embodiments, the wagering game machine 506 can include additional peripheral devices and/or more than one of each component shown in FIG. 5. For example, in some embodiments, the wagering game machine 506 can include multiple external system interfaces 524 and/or multiple CPUs 526. In some embodiments, any of the components can be integrated or subdivided.

In some embodiments, the wagering game machine 506 includes an animation integration module 537. The animation integration module 537 can process communications, commands, or other information, where the processing can integrate wagering games and environmental conditions.

Furthermore, any component of the wagering game machine 506 can include hardware, firmware, and/or machine-readable media including instructions for performing the operations described herein.

Mobile Wagering Game Machine

Figure 6:
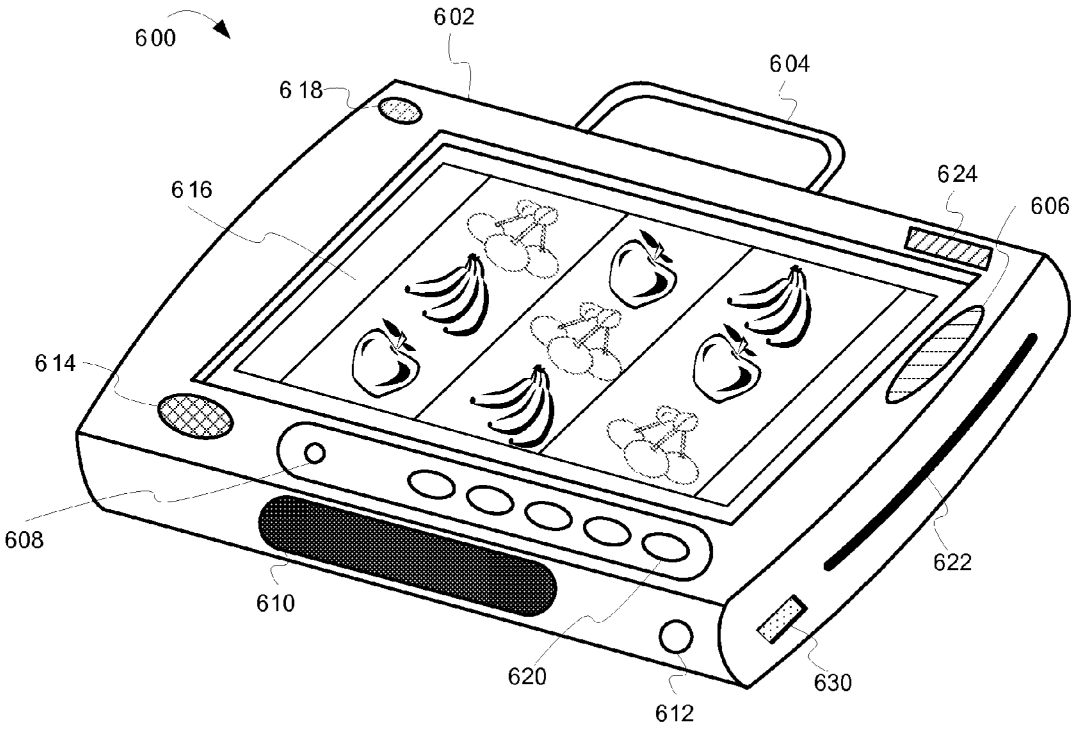
FIG. 6 is an illustration of a mobile wagering game machine 600, according to some embodiments.

FIG. 6 is a conceptual diagram that illustrates an example of a mobile wagering game machine 600, according to some embodiments. In FIG. 6, the mobile wagering game machine 600 includes a housing 602 for containing internal hardware and/or software such as that described above vis-à-vis FIG. 5. In some embodiments, the housing has a form factor similar to a tablet PC, while other embodiments have different form factors. For example, the mobile wagering game machine 600 can exhibit smaller form factors, similar to those associated with personal digital assistants. In some embodiments, a handle 604 is attached to the housing 602. Additionally, the housing can store a foldout stand 610, which can hold the mobile wagering game machine 600 upright or semi-upright on a table or other flat surface.

The mobile wagering game machine 600 includes several input/output devices. In particular, the mobile wagering game machine 600 includes buttons 620, audio jack 608, speaker 614, display 616, biometric device 606, wireless transmission devices (e.g., wireless communication units 612 and 624), microphone 618, and card reader 622. Additionally, the mobile wagering game machine can include tilt, orientation, ambient light, or other environmental sensors.

In some embodiments, the mobile wagering game machine 600 uses the biometric device 606 for authenticating players, whereas it uses the display 616 and the speaker 614 for presenting wagering game results and other information (e.g., credits, progressive jackpots, etc.). The mobile wagering game machine 600 can also present audio through the audio jack 608 or through a wireless link such as Bluetooth.

In some embodiments, the wireless communication unit 612 can include infrared wireless communications technology for receiving wagering game content while docked in a wager gaming station. The wireless communication unit 624 can include an 802.11G transceiver for connecting to and exchanging information with wireless access points. The wireless communication unit 624 can include a Bluetooth transceiver for exchanging information with other Bluetooth enabled devices.

In some embodiments, the mobile wagering game machine 600 is constructed from damage resistant materials, such as polymer plastics. Portions of the mobile wagering game machine 600 can be constructed from non-porous plastics, which exhibit antimicrobial qualities. Also, the mobile wagering game machine 600 can be liquid resistant for easy cleaning and sanitization.

In some embodiments, the mobile wagering game machine 600 can also include an input/output ("I/O") port 630 for connecting directly to another device, such as to a peripheral device, a secondary mobile machine, etc. Furthermore, any component of the mobile wagering game machine 600 can include hardware, firmware, and/or machine-readable media including instructions for performing the operations described herein.

Wagering Game Machine

Figure 7:
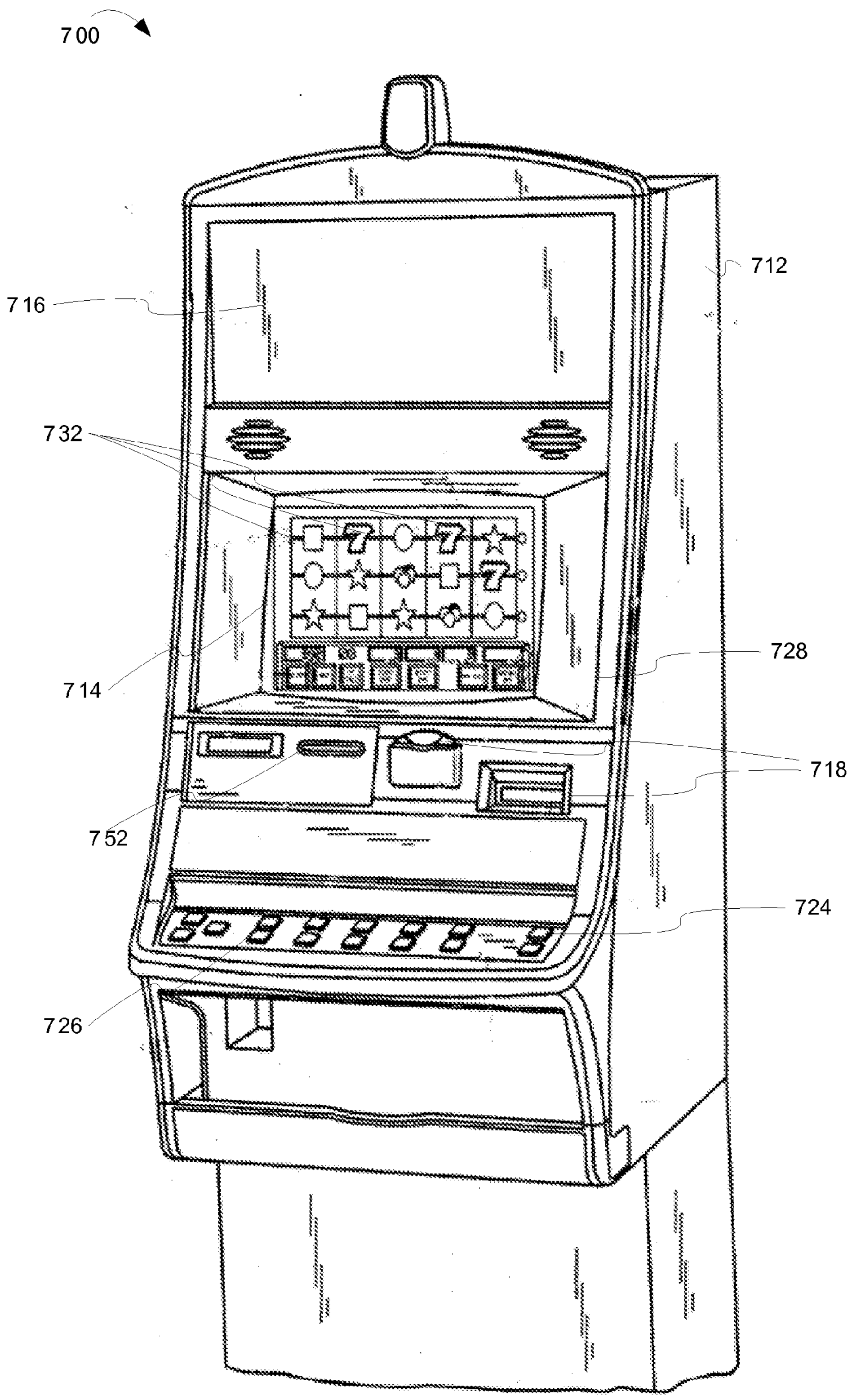
FIG. 7 is an illustration of a wagering game machine 700, according to some embodiments.

FIG. 7 is a conceptual diagram that illustrates an example of a wagering game machine 700, according to some embodiments. Referring to FIG. 7, the wagering game machine 700 can be used in gaming establishments, such as casinos. According to some embodiments, the wagering game machine 700 can be any type of wagering game machine and can have varying structures and methods of operation. For example, the wagering game machine 700 can be an electromechanical wagering game machine configured to play mechanical slots, or it can be an electronic wagering game machine configured to play video casino games, such as blackjack, slots, keno, poker, blackjack, roulette, etc.

The wagering game machine 700 comprises a housing 712 and includes input devices, including value input devices 718 and a player input device 724. For output, the wagering game machine 700 includes a primary display 714 for displaying information about a basic wagering game. The primary display 714 can also display information about a bonus wagering game and a progressive wagering game. The wagering game machine 700 also includes a secondary display 716 for displaying wagering game events, wagering game outcomes, and/or signage information. While some components of the wagering game machine 700 are described herein, numerous other elements can exist and can be used in any number or combination to create varying forms of the wagering game machine 700.

The value input devices 718 can take any suitable form and can be located on the front of the housing 712. The value input devices 718 can receive currency and/or credits inserted by a player. The value input devices 718 can include coin acceptors for receiving coin currency and bill acceptors for receiving paper currency. Furthermore, the value input devices 718 can include ticket readers or barcode scanners for reading information stored on vouchers, cards, or other tangible portable storage devices. The vouchers or cards can authorize access to central accounts, which can transfer money to the wagering game machine 700.

The player input device 724 comprises a plurality of push buttons on a button panel 726 for operating the wagering game machine 700. In addition, or alternatively, the player input device 724 can comprise a touch screen 728 mounted over the primary display 714 and/or secondary display 716.

The various components of the wagering game machine 700 can be connected directly to, or contained within, the housing 712. Alternatively, some of the wagering game machine's components can be located outside of the housing 712, while being communicatively coupled with the wagering game machine 700 using any suitable wired or wireless communication technology.

The operation of the basic wagering game can be displayed to the player on the primary display 714. The primary display 714 can also display a bonus game associated with the basic wagering game. The primary display 714 can include a cathode ray tube (CRT), a high resolution liquid crystal display (LCD), a plasma display, light emitting diodes (LEDs), or any other type of display suitable for use in the wagering game machine 700. Alternatively, the primary display 714 can include a number of mechanical reels to display the outcome. In FIG. 7, the wagering game machine 700 is an "upright" version in which the primary display 714 is oriented vertically relative to the player. Alternatively, the wagering game machine can be a "slant-top" version in which the primary display 714 is slanted at about a thirty-degree angle toward the player of the wagering game machine 700. In yet another embodiment, the wagering game machine 700 can exhibit any suitable form factor, such as a free standing model, bar top model, mobile handheld model, or workstation console model.

A player begins playing a basic wagering game by making a wager via the value input device 718. The player can initiate play by using the player input device's buttons or touch screen 728. The basic game can include arranging a plurality of symbols along a pay line 732, which indicates one or more outcomes of the basic game. Such outcomes can be randomly selected in response to player input. At least one of the outcomes, which can include any variation or combination of symbols, can trigger a bonus game.

In some embodiments, the wagering game machine 700 can also include an information reader 752, which can include a card reader, ticket reader, bar code scanner, RFID transceiver, or computer readable storage medium interface. In some embodiments, the information reader 752 can be used to award complimentary services, restore game assets, track player habits, etc.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A system comprising:

one or more processors; and one or more memory storage devices configured to store instructions, which when executed by at least one of the one or more processors, cause the system to perform operations to detect that a physical object is within view of an image capture device associated with a wagering game machine, wherein the physical object is within a physical environment external to the wagering game machine in a casino, generate an animated wagering game object within an animated environment, based on the physical object, wherein the animated environment is presented via a display of the wagering game machine as a virtual representation of the physical environment for a wagering game application, determine, while the physical object is in view of the image capture device, real-time movement of the physical object, present, via the display of the wagering game machine, the animated wagering game object moving about the animated environment to match the real-time movement of the physical object relative to the physical environment, detect, via sensors associated with the wagering game machine, an environmental condition external to the wagering game machine, in response to detection of the environmental condition external to the wagering game machine, generate an animated effect within the animated environment, present, within the animated environment, the animated effect, and cause the animated wagering game object to move within the animated environment based on the animated effect within the animated environment.

2. The system of claim 1, wherein the one or more memory storage devices are configured to store instructions, which when executed by at least one of the one or more processors, cause the system to further perform operations to:

detect an environmental condition associated with the physical object in the physical environment;

determine an animation object construction rule for the wagering game application that relates to the environmental condition;

determine a three-dimensional effect that the environmental condition would have on the animated wagering game object based on the animation object construction rule; and apply the three-dimensional effect to the animated wagering game object.

3. The system of claim 2, wherein the three-dimensional effect relates to one or more of shadowing of the animated wagering game object based on a position of a light in the physical environment relative to the physical object, color gradients of the animated wagering game object based on a color of a light within the environment, depth perspective of wagering game object geometries of the animated wagering game object based on a distance of the physical object to the wagering game machine within the environment, and reflections off of the animated wagering game object of one or more of the physical object and additional physical objects in the physical environment.

4. The system of claim 1, wherein the environmental condition is a sound.

5. The system of claim 4, wherein the operation to cause the animated wagering game object to move within the animated environment based on the animated effect within the animated environment comprises one of an attraction and a repulsion of the animated wagering game object to the sound.

6. One or more non-transitory machine-readable storage media having instructions stored thereon, which when executed by a set of one or more processors cause the set of one or more processors to perform operations comprising:

receiving input of images of a physical object within an environment external to a wagering game machine within a casino, wherein the images of the physical object are taken from multiple perspectives around the wagering game machine;

generating a three-dimensional animated object in an animated environment of a wagering game animation for a wagering game application presentable via the wagering game machine, wherein the animated environment is a virtual representation of the environment external to the wagering game machine, and wherein the three-dimensional animated object within the animated environment has an animated appearance of the images of the physical object within the environment external to the wagering game machine according to the multiple perspectives;

detecting real-time movement of the physical object in relation to a boundary in the environment external to the wagering game;

causing presentation, on the wagering game machine, of the three-dimensional animated object moving within the animated environment to match the real-time movement of the physical object in relation to the boundary;

detecting, via sensors associated with the wagering game machine, an environmental condition external to the wagering game machine;

in response to detecting the environmental condition external to the wagering game machine, generating an animated effect within the animated environment;

presenting, within the animated environment, the animated effect; and causing the animated wagering game object to move within the animated environment based on the animated effect within the animated environment.

7. The one or more non-transitory machine-readable storage media of claim 6, wherein the operation for generating the three-dimensional animated object comprises generating animated reflective surfaces of the three-dimensional animated object, wherein the animated reflective surfaces appear to reflect the images of the physical object within the environment external to the wagering game machine.

8. The one or more non-transitory machine-readable storage media of claim 7, wherein the operation for generating the three-dimensional animated representation includes operations further comprising:

generating an internal light source, internal to the wagering game application, that possesses one or more internal light source properties equivalent to one or more external light source properties associated with the environment external to the wagering game machine; and using the internal light source properties of the internal light source to generate the animated reflective surfaces.

9. The one or more non-transitory machine-readable storage media of claim 7, said operations further comprising:

presenting reflections of additional animated objects within the wagering game animation on the reflective surfaces of the three-dimensional animated object.

10. The one or more non-transitory machine-readable storage media of claim 9, wherein the environmental condition is a sound.

11. The one or more non-transitory machine-readable storage media of claim 9, wherein the physical object is an additional wagering game machine in the environment external to the wagering game machine, and said operations further comprising:

presenting an animated character in the wagering game animation that represents a player associated with the additional wagering game machine;

detecting player input at the additional wagering game machine; and presenting, based on the player input, movement of the animated character from a viewing perspective associated with a location of the wagering game machine in relation to the additional wagering game machine.

12. An apparatus comprising:

a processor; and an animation integration module configured to receive input that characterizes a visual perspective of a casino environment and one or more casino objects in the casino environment, generate an animated wagering game setting that emulates an appearance of the casino environment based on the visual perspective characterized by the input, generate one or more animated wagering game objects that emulate an appearance of the one or more casino objects in the casino environment based on the visual perspective characterized by the input, present an animated perspective of the one or more animated wagering game objects within the animated wagering game setting in a way that emulates the visual perspective of the one or more casino objects in the casino environment, determine real-time movement of the one or more casino objects, cause movement of the one or more animated wagering game objects within the animated wagering game setting based on the real-time movement of the one or more casino objects, detect, via sensors, an environmental condition external to the animated wagering game setting, generate an animated effect based on the environmental condition, present, within the wagering game setting, the animated effect, and cause the one or more animated wagering game objects to move within the animated wagering game setting based on the animated effect within the animated wagering game setting.

13. The apparatus of claim 12, wherein the visual perspective is based on an orientation of a wagering game machine in relation to the casino environment and the one or more casino objects, and wherein the animation integration module is further configured to determine a change in the orientation of the wagering game machine in relation to the casino environment and the one or more casino objects, and present a change in the animated perspective of the one or more animated wagering game objects within the animated wagering game setting in way that matches the change in the orientation of the wagering game machine.

14. The apparatus of claim 12, wherein the environmental condition is a sound.

15. The apparatus of claim 12, wherein the one or more casino objects are contained within a bounded area of the casino environment, and wherein the input characterizes a visual perspective of only the one of more casino objects that are contained within the bounded area.

16. A computer-implemented method comprising:

taking an image of a physical object within a physical environment, wherein the physical object is external to a wagering game machine;

based on the image of the physical object, generating a virtual wagering game object for a wagering game, wherein the virtual wagering game object has a visual appearance similar to the image of the physical object within the physical environment;

determining real-time movement of the physical object within the physical environment;

presenting, via a display device of the wagering game machine, the virtual wagering game object moving about a virtual environment to match the real-time movement of the physical object;

detecting, via sensors associated with the wagering game machine, an environmental condition external to the wagering game machine;

generating an animated effect within the virtual environment corresponding to the environmental condition external to the wagering game machine;

presenting, within the virtual environment, the animated effect; and causing the virtual wagering game object to move within the virtual environment based on the animated effect within the virtual environment.

17. The computer-implemented method of claim 16, further comprising:

generating the virtual environment similar in visual appearance to physical environment.

18. The computer-implemented method of claim 17 further comprising:

taking pictures of the physical object within the physical environment external to the wagering game machine from multiple camera angles around the wagering game machine; and generating virtual images of three-dimensional reflections within the virtual environment, wherein the virtual images of the three-dimensional reflections include a representation of the pictures of the physical object within the physical environment taken from the multiple camera angles.

19. The computer-implemented method of claim 17, wherein the environmental condition is a sound. further comprising:

20. The computer-implemented method of claim 16 further comprising:

detecting a visual condition associated with the physical object in the physical environment; and generating a three-dimensional effect for the virtual wagering game object based on the visual condition.

21. The computer-implemented method of claim 20, wherein the three-dimensional effect relates to one or more of shadowing of the virtual wagering game object based on a position of a light in the physical environment relative to the physical object, a color gradient of the virtual wagering game object based on a color of a light within the physical environment, depth perspective of the virtual wagering game object based on a distance of the physical object to the wagering game machine within the physical environment, and reflections off of the virtual wagering game object of one or more of the image of the physical object and images of additional physical objects in the physical environment.

* * * * *